United States Patent
Murata et al.

(10) Patent No.: US 6,636,649 B1
(45) Date of Patent: Oct. 21, 2003

(54) IMAGE PROCESSING APPARATUS AND THE METHOD OF CORRECTING THE INCLINATION

(75) Inventors: Kazuyuki Murata, Kyoto-fu (JP); Takehito Yamaguchi, Osaka-fu (JP); Hideyuki Kuwano, Osaka-fu (JP); Yuji Okada, Hyogo-ken (JP); Joji Tanaka, Osaka-fu (JP); Naoki Takahashi, Osaka-fu (JP); Kenji Hisatomi, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/421,330

(22) Filed: Oct. 18, 1999

(30) Foreign Application Priority Data

Oct. 16, 1998 (JP) .......................... 10-294933

(51) Int. Cl.⁷ ................................ G06K 9/32
(52) U.S. Cl. ................... 382/295; 382/293; 382/296; 382/297
(58) Field of Search ............... 382/296, 297, 382/293, 295, 298, 289, 305, 286, 290, 275; 345/649; 358/2.1; 235/456

(56) References Cited

U.S. PATENT DOCUMENTS

| | | | |
|---|---|---|---|
| 4,759,076 A | | 7/1988 | Tanaka et al. |
| 4,788,599 A | * | 11/1988 | Sugishima .................. 358/296 |
| 4,802,229 A | | 1/1989 | Yamada |
| 5,050,225 A | | 9/1991 | Itoh |
| 5,187,753 A | * | 2/1993 | Bloomberg et al. .......... 382/289 |
| 5,233,168 A | * | 8/1993 | Kulik .......................... 235/456 |
| 5,418,896 A | * | 5/1995 | Kumamoto et al. ........ 382/286 |
| 5,471,549 A | * | 11/1995 | Kurosu et al. .............. 382/290 |
| 5,625,719 A | * | 4/1997 | Fast et al. ................... 382/275 |
| 6,097,855 A | * | 8/2000 | Levien ........................ 382/296 |

FOREIGN PATENT DOCUMENTS

| | | |
|---|---|---|
| JP | 59-188635 | 10/1984 |
| JP | 59-188636 | 10/1984 |
| JP | 2-287684 | 11/1990 |
| JP | 4-148279 | 5/1992 |
| JP | 5-252379 | 9/1993 |

* cited by examiner

Primary Examiner—Amelia M. Au
Assistant Examiner—Brian Le
(74) Attorney, Agent, or Firm—McDermott, Will & Emery

(57) ABSTRACT

It is possible for the present invention to carry out the inclination correcting by adding a simple constitution of shifting an image only in the main-scanning direction to that of the conventional image processing apparatus. The first line shifting means 65 shifts the image data in the main scanning direction by specific number of lines in the shifting amount corresponding to the inclined angle detected by the inclined angle detecting means 66. The first rotating means 85 rotates the image data stored in the first image memory 88 by 90 degree or 270 degree, and then interchanges the main-scanning direction and the sub-scanning direction. The second line shifting means 91 shifts the image data rotated by the first rotating means 85 in the main-scanning direction.

19 Claims, 14 Drawing Sheets

(a)

(b)

IMAGE PROCESSING APPARATUS AND THE METHOD OF CORRECTING THE INCLINATION

FIELD OF THE INVENTION

This invention relates to an image processing apparatus, and more specifically, an image processing apparatus for correcting the inclination (rotating correction) of an original image read slantwise.

BACKGROUND OF THE INVENTION

In a digital copying machine disclosed in the Japanese patent laid-open publication No. 4-148279, an original set slantingly on an original setting plate of the image scanner is processed by the following inclination correcting First, coordinates of four vertexes of the original are detected by the pre-scan. In accordance with those coordinates, the inclined angle of the original is detected. At the scanning for reading the original image (hereinafter called a "regular scan"), the read image data are stored by a line-buffer for a plural number of lines. The process of reading the image data from the line-buffer is performed in accordance with the address corrected by the inclined angle detected as above.

In the Japanese patent laid-open publication No. 5-252379, the other inclination correcting is disclosed.

While reading the original image, the inclined angle is detected at real time in accordance with the difference between a main-scanning original-edge position on the preceding line and that on the current line. And by using the inclined angle, the image shifting is performed in the main-scanning direction and the sub-scanning direction respectively. The image shifting in the sub-scanning direction is arranged to be performed by correcting the writing address in the image memory (the page memory).

The constitution disclosed in the Japanese patent laid-open publication No. 4-148279 is superior in respect of not using the page memory. According to the constitution, however, because the rotating based on the affine transformation is processed by using the reading address control at the time of reading in a buffer memory, the address generating circuit becomes complicated. And considering the case that the address calculated result is not an integer, it is necessary to perform the interpolating and so on.

In the constitution disclosed in the Japanese patent laid-open publication No. 5-252379, because the image shifting in the sub-scanning direction is performed at the time of the writing into the image memory, it is required to generate the non-sequential writing address. In a result, the address generating circuit becomes complicated. And since the magnification difference generated at the inclination correcting is not considered in such constitution, the magnification of the image after the inclination correcting is different from the original size.

SUMMARY OF THE INVENTION

The present invention is proposed in order to solve the above-mentioned problems, and has an object to provide an image processing apparatus able to correct the inclination and the magnification difference generated at the rotating correction by means of adding the simple constitution of shifting an image data only in the main-scanning direction to the conventional image processing apparatus.

In order to achieve the above object the invention adopts the following means. As shown in FIG. 14(a), the invention is presumed to be an image processing apparatus for correcting the inclination of image data while reading originals as image data by the electric scanning Inclined angle detecting means 66 detects the inclined angle of the original. First line shifting means 65 shifts the image data in the main-scanning direction by specific number of lines in the shifting amount corresponding to the inclined angle detected by the inclined angle detecting means 66. First image memory 88 stores the image data shifted by the first line shifting means 65. First rotating means 85 rotates the image data stored in the first image memory 88 by 90 degree or 270 degree, so that the main-scanning direction of the initial image data could change to the sub-scanning direction. Namely, the main-scanning direction is interchanged to the sub-scanning direction. Second line shifting means 91 shifts the image data rotated by the first rotating means 85 in the main-scanning direction (in the sub-scanning direction of the initial image data) by specific number of lines in the shifting amount corresponding to the inclined angle detected by the inclined angle detecting means 66. According to such arrangement of adding the simple constitution of shifting an image data only in the main-scanning direction to the conventional image processing apparatus, it is possible to correct the inclination of an initial image data not only in the main-scanning direction but also in the sub-scanning direction by rotating the initial image data.

In the invention, the image data to be shifted by the first line-shifting means 65 is an image signal transferred at the fixed rate. The first line shifting means 65 advances or delays the timing the signal determining the effective length of the image signal becomes enabled along with the progress of the sub-scan, thereby the image data is shifted as described above. According to this arrangement, as a part of the inclination correcting (that is, the shifting by the first line shifting means 65) is performed along with reading the image data (at a step of the image signal), it is possible to shorten the time for the inclination correcting.

And the magnification correcting means which are not shown corrects at the time of reading the image data the magnification difference which is generated by the inclination correcting based on the inclined angled detected by the inclined angle detecting means 66. As described, when the magnification correcting is performed at the time of reading the image data, the magnification correcting is executed for the multi-valued image data. Therefore it is possible to keep the deterioration of the picture quality to a minimum.

In case the first line shifting means 65 is common to the second line shifting means 91, the constitution of the hardware can be more simplified. Namely, in case of including a selector for selecting either an image data at the time of reading or an image data rotated by the first rotating means 85 and inputting it into the first line shifting means 65, it is possible to obtain the same effect as described above without using the second line shifting means 91.

DETAILED DESCRIPTION OF THE PREFERRED EMBODIMENT

Figure 1:
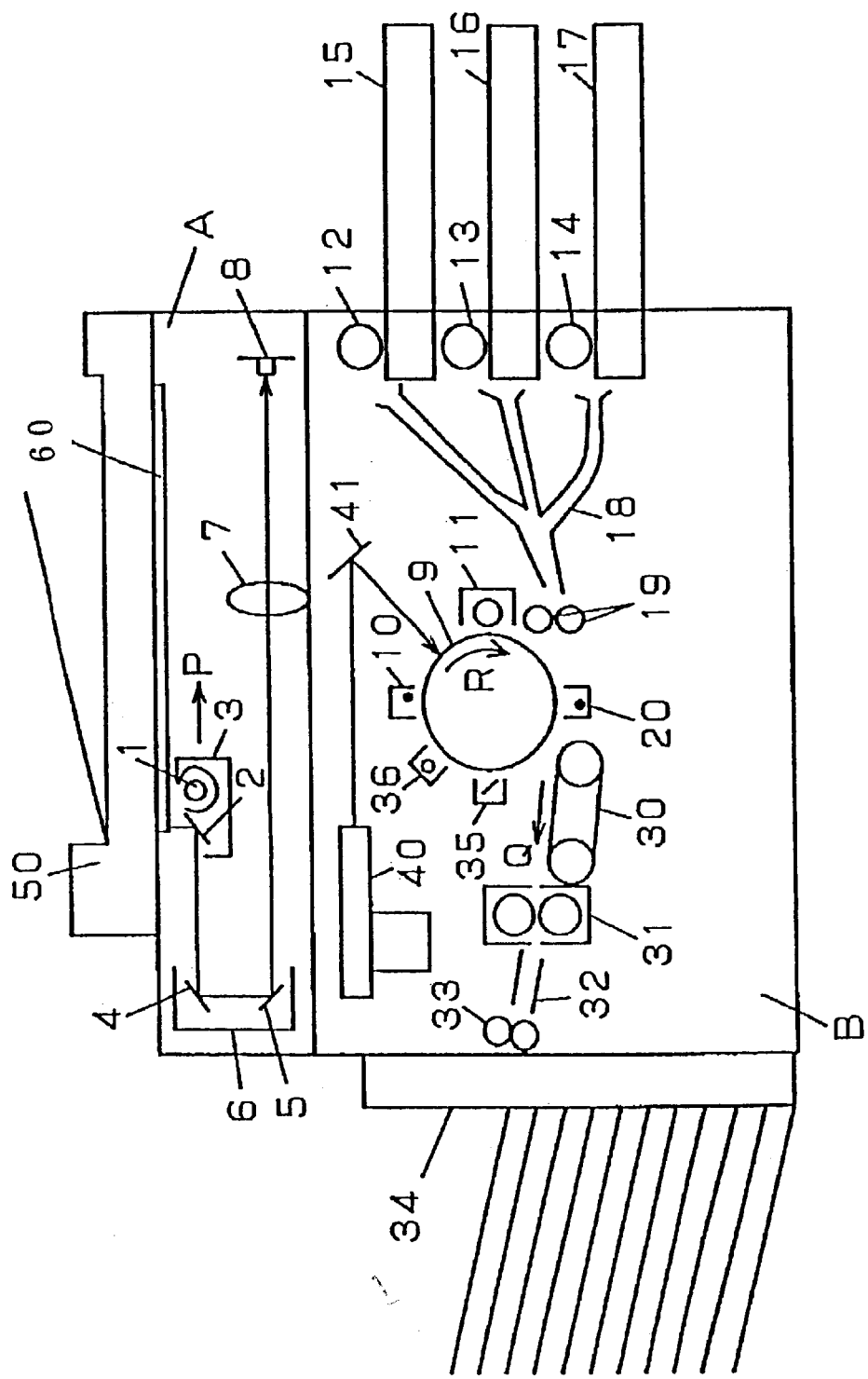
FIG. 1 is a sectional side elevation showing a schematic structure of a digital integrated apparatus adopting the present invention

The preferred embodiments of the present invention are explained in details hereinafter referring to the drawings.

Embodiment 1

FIG. 1 is a sectional side elevation showing a schematic constitution of a digital integrated apparatus adopting the present invention, which is explained as follows.

A plural number of originals which are set on an auto document feeder (hereinafter called "ADF") are passed on an original setting plate 60 one after another along with facing downward, and then exposed by an exposing lamp 1. The reflected light from the original is converged by a lens 7 via a first mirror 2, a second mirror 4 and a third mirror 5, and then converged on a image sensor 8.

An uniform velocity unit 3 composed of the exposing lamp 1 and the first mirror 2 moves in an arrow P direction at fixed speed. And a half speed unit 6 composed of the second mirror 4 and the third mirror 5 moves in the same direction as the uniform velocity unit 3 at a half speed of the uniform velocity unit.

Here, a scanning direction of the image sensor 8 is defined as a main-scanning direction, and a moving direction of the uniform velocity unit 3 as a sub-scanning direction A main charger 10 charges uniformly a photoconductive drum 9 which rotates in an arrow R direction at fixed speed. A laser beam radiated from a laser scanner unit 40 is utilized for the exposing scan over the photoconductive drum 9 via a mirror 41, thereby an electrostatic latent image is formed on the photoconductive drum 9. And a developing unit 11 develops an electrostatic latent image by means of toner, thereby a toner image is formed on the photoconductive drum 9.

According to the above arrangement, the real time copying that is to say an operation for recording original images along with the reading can be carried out by synchronizing a main-scanning period of an image scanner A, that of a laser printer R and a sub-scanning speed/cycle-speed.

The flow of image signals in a digital copying machine adopting the invention is explained with reference to FIG. 2.

An analog image signal 71 outputted from the image sensor 8 of the image scanner A (see FIG. 1) is inputted to an A/D converter 72, converted to a digital image signal 73 of 8 bits by the A/D converter 72, and then inputted into a shading correction circuit 74. The shading correction circuit 74 corrects the dispersion of the sensitivity, the offset and the radiance per pixel of the image sensor 8 by using a reference data of white and a reference data of black recorded in advance, and then outputs a signal 75.

A multiplexer 76 selects either a signal 75 from the shading correction circuit 74 or a multi-valued image signal 99 from the output image processing circuit 98 described later, and then outputs an image signal 77 of 8 bits. The image signal 77 is inputted into an input image processing circuit 78, is processed in the input image processing circuit 78 by the input image processing described later, and is inputted as a binary image signal 79 into a compressing circuit 80. The binary image signal 79 is processed in the compression circuit 80 by a real time compression (JBIG format, etc.) and is stored as a coded data 81 by a code memory 82. The coded data 81, after being decoded by a compressing/expanding circuit 93 and being inputted as a binary image data 84 into a rotating circuit (rotating means) 85, is stored by an image memory 88 with or without the rotating of 90 degree or 270 degree at the rotating circuit 85.

A line shifting circuit 91 as the second line shifting means reads the image data thus stored in the image memory 88 in raster sequence, and outputs an output data 92 after the second line shifting described later. And the output data 92 is coded (in JBIG format, etc.) by the compressing/expanding circuit 93, and then stored as a coded data 94 by the code memory 82.

A multiplexer 96 selects either one of the binary image signal 79 from the input image processing circuit 78, the binary image signal 89 read from the image memory 88, or the binary image signal 95 expanded by the compressing/expanding circuit 93, which is outputted as a binary image signal 97. The binary image signal 97 is inputted into an output image processing circuit 98, is processed in the output image processing circuit 98 by specific processings (for instance, a the converting to an multi-valued image signal of 8 bits, or the gamma correcting of characteristics of recording side in a printer, and so on), and is outputted as an image signal 99 of 8 bits.

Therefore, a modulation circuit 100 performs the PMW modulation based on the image signal 99, and outputs a PMW signal to a laser driver 101. The laser driver 101 activates a semiconductor laser in the laser printer B in accordance with the PMW signal.

Figure 2:
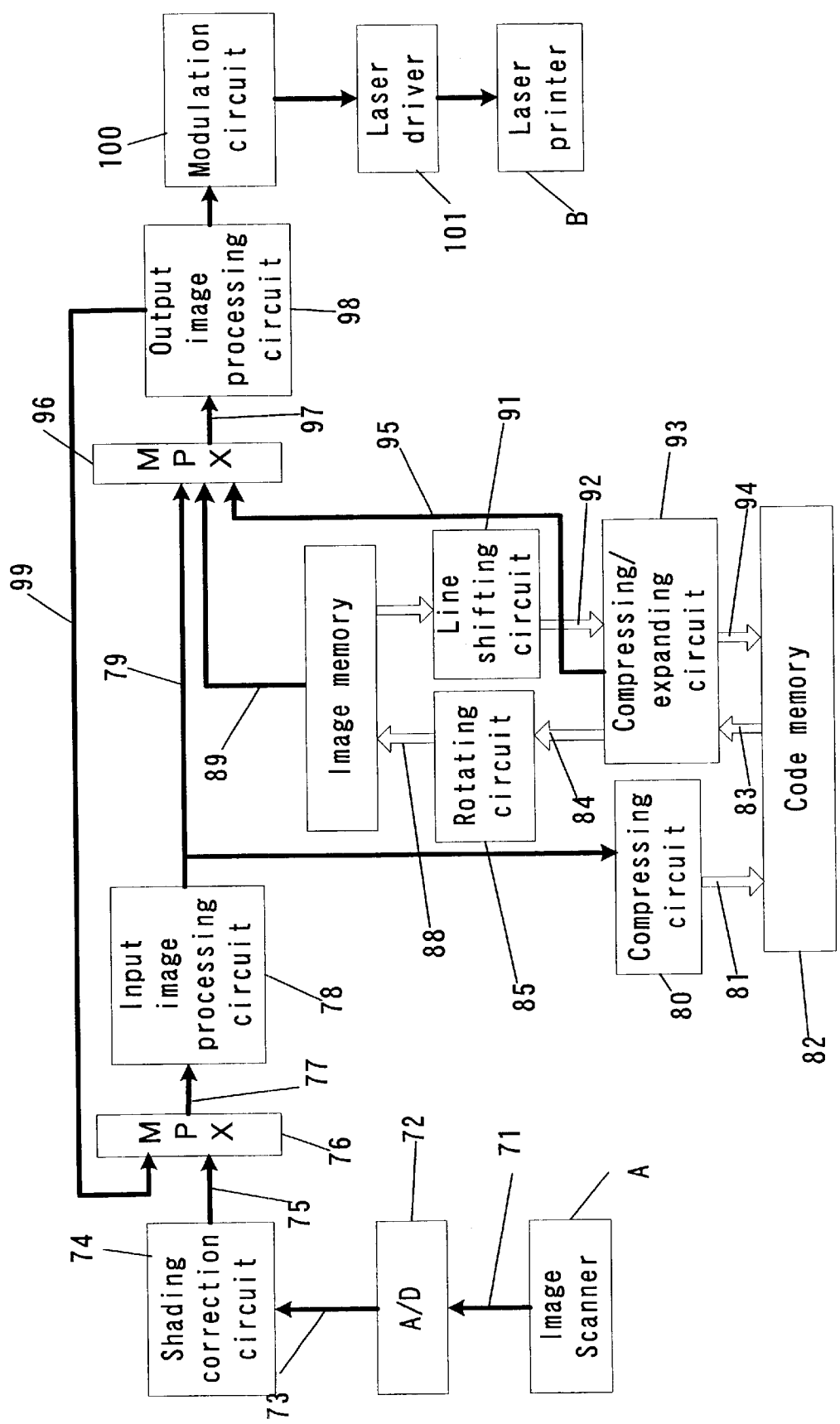
FIG. 2 is a flowchart of image signals in a digital integrated apparatus adopting the present invention.

The setup and control of each circuit shown in FIG. 2 is made by a CPU not shown.

A black arrow shown in FIG. 2 indicates a video signal of binary or multi-valued, which is a raster signal at specific data rate (called "video rate" hereinafter). And a white arrow indicates a parallelized binary image data or a coded data, which is transmitted in and out non-synchronously.

Figure 3:
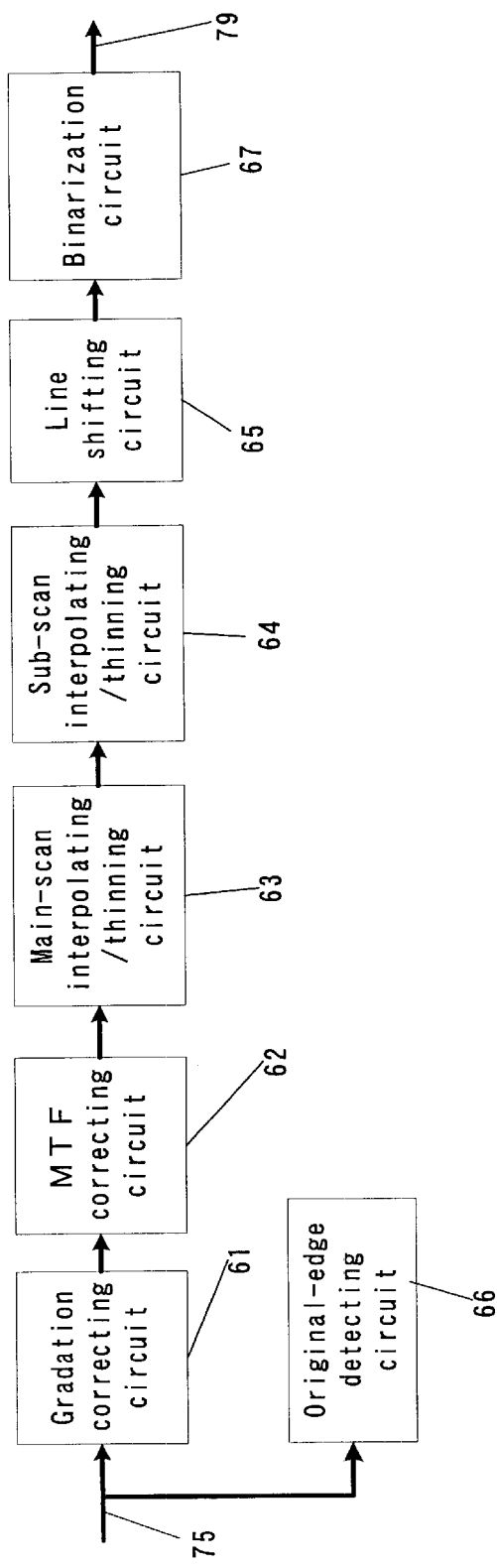
FIG. 3 is a block diagram showing an input image processing circuit 78.

The input image processing circuit 78 described here is composed of a plural number of circuits shown in FIG. 3.

A gradation correcting circuit 61 comprises a look-up table of 256 bits. By down load of the desired data the gradation characteristics is set up. A MTF correcting circuit 62 performs the edge enhancement processing based on the spatial filtering by means of a line buffer. A main-scan interpolating/thinning circuit 63, by the thinning and the interpolation inserting for pixels in the main-scanning direction, performs the pixel density converting (magnification and reduction) in the main scanning direction. A sub-scan interpolating/thinning circuit 64, by the thinning and the interpolation inserting for lines in the sub-scanning direction, performs the line density converting (magnification and reduction) in the sub-scanning direction A binarization circuit 67 binarizes the inputted image signal of 8 bits by means of the error diffusion method or other binarization method, and then outputs a binary image signal 79.

Figure 4:
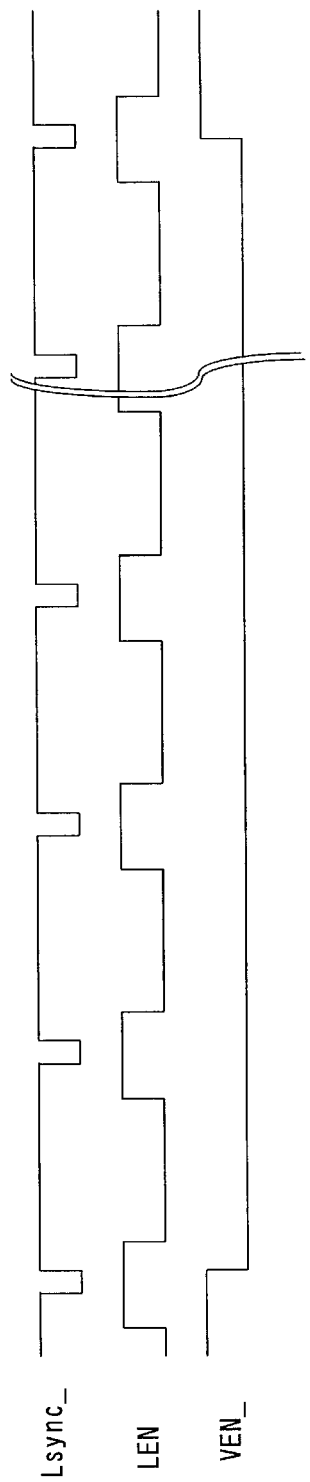
FIG. 4 is a basic timing chart of video signals.

The line shifting circuit 65 and the original-edge detecting circuit 66 will be explained later. The basic timing of the video signal is described hereinafter with reference to FIG. 4.

A line SYNC (Lsync_) is an active-low pulse signal (the condition that the pulse signal at the time of low is active is called "active-low"), and indicates a start timing for the line scanning (the main-scanning) of the image sensor. A line enable (LEN_) is an active-low signal, and indicates an effective term of the image signal within the main-scanning period. A vertical enable (VEN_) is an active-low signal, and indicates an effective term of the sub-scanning within a page.

When both the line enable (LEN_) and the vertical enable (VEN_) are active, an effective image signal flows on a signal line. Each circuit block (for instance, each circuit block shown in FIG. 3) receives the line enable (LEN_), the vertical enable (VEN_), and the image signal from the preceding circuit block and processes them with the video rate. After the processing the line enable (LEN_), the vertical enable (VEN_), and the image signal is transferred to the following circuit block.

The line shifting circuit 65 is explained hereinafter.

Figure 5:
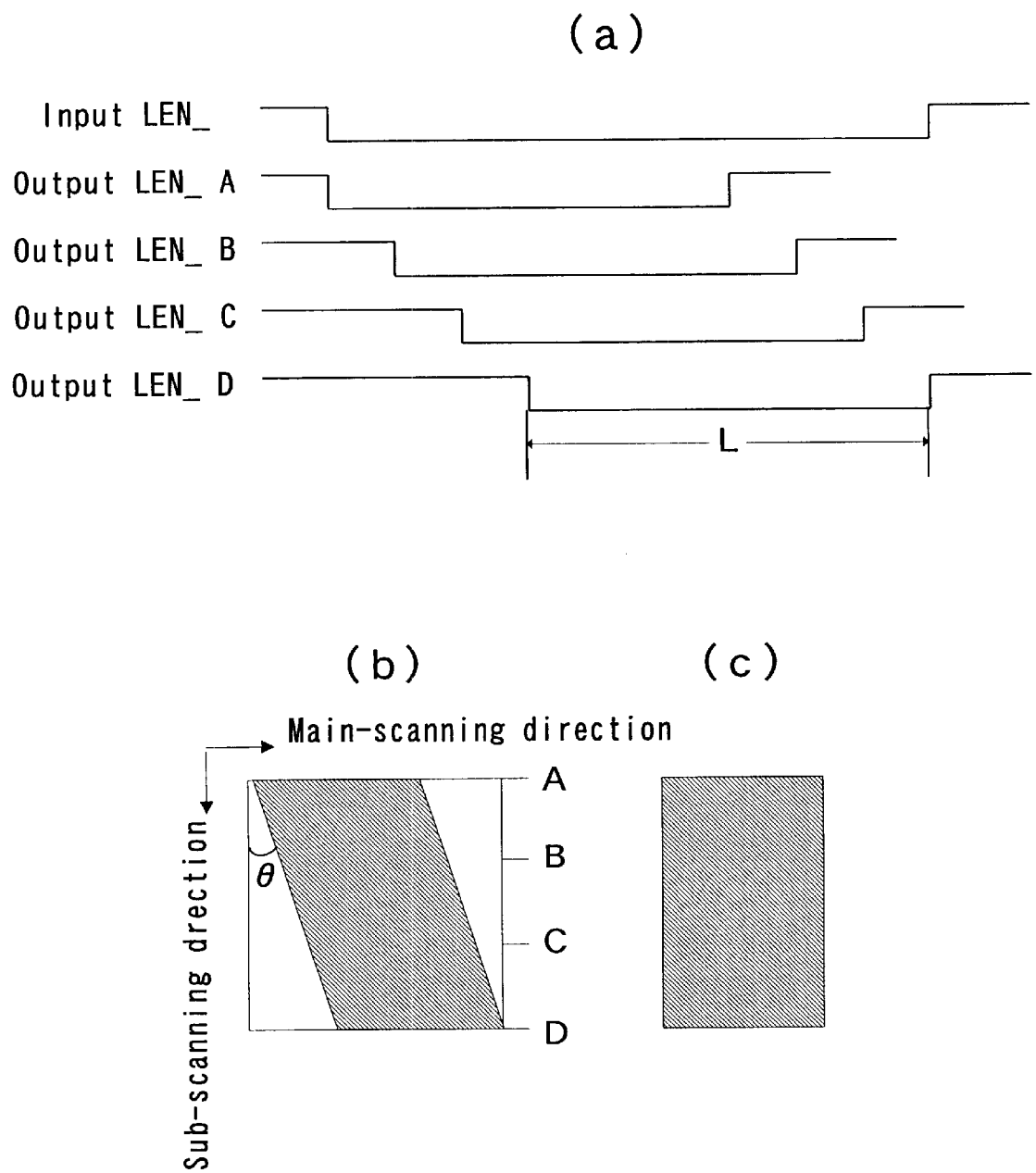
FIG. 5(a), FIG. 5(b) and FIG. 5(c) are an explanatory diagram of the operation of a line shifting circuit 65.
Figure 6:
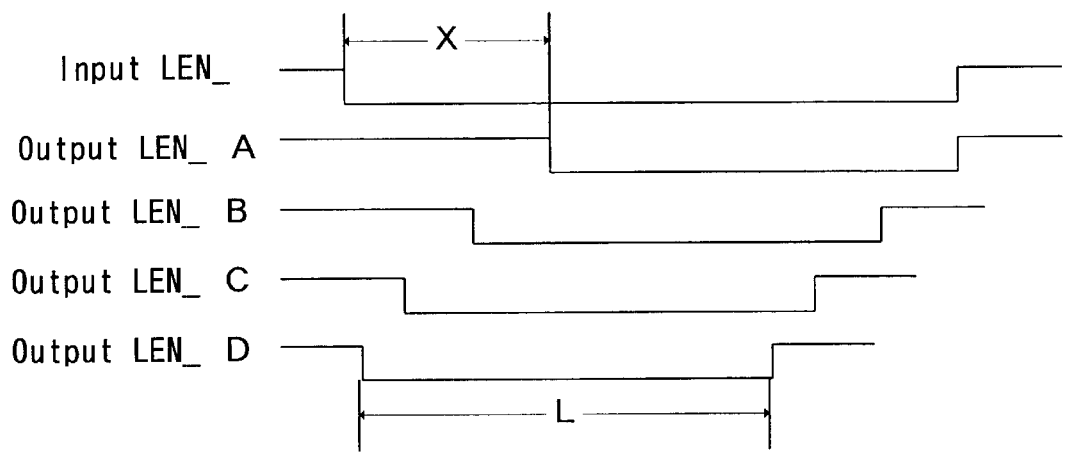
FIG. 6(a), FIG. 6(b) and FIG. 6(c) are an explanatory diagram of the operation of a line shifting circuit 65.
Figure 6:
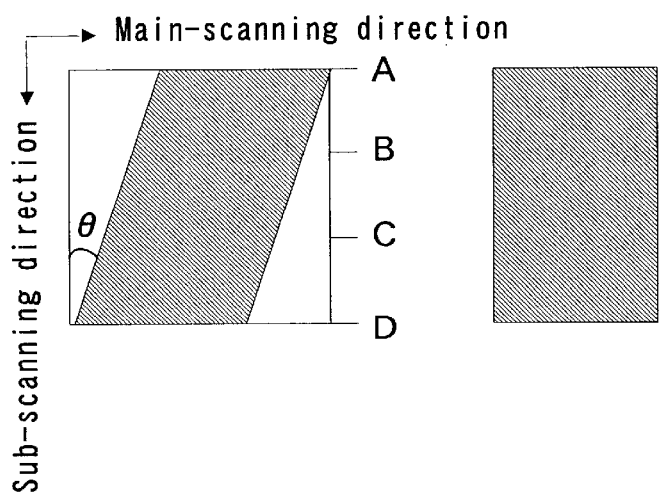

In FIG. 5(*a*) and FIG. 6(*a*), an input LEN_ is the line enable inputted from the line shifting circuit 65 and an output LEN_ is the line enable outputted from the line shifting circuit 65.

Generally the width of the output LEN_ (effective number of pixels) is arranged to be narrower enough to scan the original than that of the input LEN_. As the sub-scan progresses, the timing the output LEN_ becomes enabled is delayed or advanced relative to the input LEN_. In case the original is inclined counterclockwise as shown in FIG. 5(*a*), the timing four outputs of LEN_A, B, C and D become enabled is delayed in the following order, the output LEN_A→the output LEN_B→the output LEN_C→the output LEN_D.

When a square surrounded by solid lines in FIG. 5(*b*) is a reading image area, an effective image area outputted from the line shifting circuit 65 is equivalent to a hatching area shown in FIG. 5(*b*). And the image signals to be inputted into the compressing circuit 80 are only image signals which is generated when both the vertical enable (VEN_) and the line enable (LEN_) are active, so that the image data to be stored by the code memory 82 can be shown as FIG. 5(*c*).

At the time of the line shifting the parameters for the processing in the line shifting circuit 65 (which are set up before the reading of originals) changes as follows. The following shifting amount indicates how many number of lines one pixel of the image signal should be shifted by.

Need or not the line shifting: Need

Direction of the line shifting: Positive direction

Initial number of pixels shifted at the line shifting: 0

Shifting amount: 1/arctan θ (θ: see FIG. 5(*b*))

Width of output LEN_: L

In case the original is inclined clockwise as shown in FIG. 6(*a*), the timing four outputs of LEN_A, B, C and D become enabled is to be advanced in the following order, the output LEN_A→the output LEN_B→the output LEN_C→the output LEN_D.

When a square area surrounded by solid lines in FIG. 6(*b*) is a reading image area, an effective image area outputted from the line shifting circuit 65 is equivalent to a hatching area shown in FIG. 6(*b*). And the image data to be stored by the code memory 82 is an hatching area shown as FIG. 6(*c*). The parameters for the processing in this case are as follows.

Need or not the line shifting: Need

Direction of the line shifting: Negative direction

Initial number of pixels shifted at the line shifting: X

Shifting amount: 1/arctan θ (θ: see FIG. 6(*b*))

Width of output LEN_: L

As described above, the shifting of image signal in the main-scanning direction is carried out by shifting the timing of the output LEN_ relative to the input LEN_.

The original-edge detecting circuit 66 is explained below.

The original-edge detecting circuit 66 detects a starting position and a terminating position in the main-scanning direction of the original area (that will be described later), and the detected result are converted to codes of 16 bits, which are updated as a starting register and a terminal register of 16 bit respectively. But when the starting position cannot be detected, a specific code of 16 bits (for instance, "0xffff", etc.) indicating such message is updated as the starting register. And when the terminal position cannot be detected, a specific code of 16 bit (for instance, "0x0000", etc.) indicating such message is updated as the terminating register.

In a CPU not shown, during the effective term of the sub-scanning (during the active term of the vertical enable (VEN_)) an interruption is generated at each main-scanning. Accordingly, the CPU can find out the sub-scanning position by counting up the number of interruption in the main scan, and sample the sub-scanning position together with the original-edge position in the main-scanning direction corresponding to the sub-scanning position by reading the starting register and the terminating register at each interruption.

The method for detecting the starting position and terminating position is described as follows.

The original-edge detecting circuit 66, when the line enable (LEN_) to be inputted is effective, is provided with a main-scanning counter for counting up per pixel. Accordingly, when a portion of the ADF 50 equivalent to the original sheet cover is colored black or an original is arranged to be read without an original sheet cover so as to open the upper side of the ADF 50, the original-edges can be detected as follows.

Namely, since in the above case the image signals outside the original area become black reference levels, within the effective term of one main-scanning a value of the main-scanning counter at the time of changing a black reference level to a white reference level first is the starting position while a value of the main-scanning counter at the time of changing a white reference level to a black reference level last is the terminating position. As the method of detecting has been disclosed in the Japanese patent laid-open publication No. 2-67081, the detailed explanation is not made here.

Figure 11:
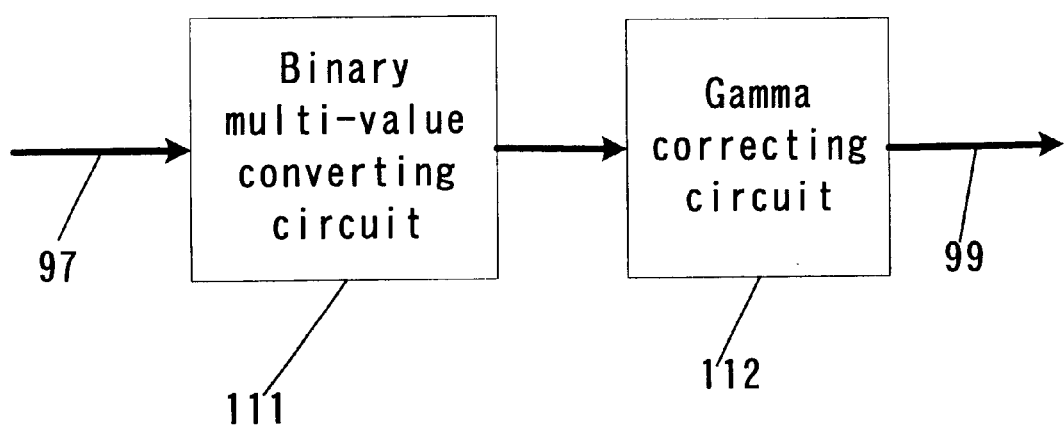
FIG. 11 is a block diagram of an output image processing circuit 98.

Next, the output image processing circuit 98 is explained in further detail with reference to FIG. 11.

The output image processing circuit 98 comprises a binary multi-value converting circuit 111 and a gamma correcting circuit 112. The binary multi-value converting circuit 111 converts a binary image signal 97 to a multi-valued image signal of 8 bits per pixel along with storing edge components. The binary multi-value converting has been a well-known method, the explanation of which is not made in detail here. The gamma correcting circuit 112 is a look-up table of 256 bits for correcting gamma characteristics of the recording side at the time of recording images by the printer.

When the MPX 76 shown in FIG. 2 selects the image signal 99, the look-up table is arranged not to perform the converting of gradation characteristics but to down load the linear table.

[The Real Time Copying]

According to FIG. 2, the flow of the image data at the time of the real time copying is explained.

While the MPX 76 selects the image signal 76, the MPX 96 selects the image signal 79. Therefore, the image signal read by the image scanner A is processed at each circuit, and is outputted in real time to the laser printer B. It is possible to perform the recording at the same time of reading originals by synchronizing and working the image scanner A and the laser printer B.

[The Memory Copying]

According to FIG. 2, the flow of the image data at the time of the memory copying is explained.

While the MPX 76 selects the image signal 75, the MPX 96 selects the image signal 95. Therefore, the image signal read by the image scanner A is processed at each circuit, encoded by the compressing circuit 80, and then stored temporarily by the code memory 82. The image data stored by the code memory 82 is decoded by the compressing/expanding circuit 93 synchronizing the operation of the laser printer B, and outputted to the laser printer B via the MPX 96.

In case of a plural sheets of copy or a plural sets of copy, the mode of the memory copying is utilized. When a first sheet or a first set is copied, the image data may be stored by the code memory 82 at the same time of the real time copying.

[The Detection of a Position and Inclination of Original by the Pre-scanning]

As described above, when the read image signal outside the original is at a black reference level, the pre-scanning for an original is performed. The pre-scanning is performed by a maximum main-scanning width or the maximum sub-scanning width able to read. And the mechanical pre-scanning speed at the pre-scanning is twice that at the usual reading for an original image. During the pre-scanning the CPU samples the starting position and terminating position of the original area detected by the original-edge detecting circuit 66, and stores them to the inside working area. After the pre-scanning in accordance with the sample data the position and inclination of the original are calculated by means of the following method.

[The Outline of the Inclination Correcting]

According to FIG. 9, the outline of the inclination correcting of the invention is explained hereinafter. In the following explanation, the "image signal" is not distinguished from the "image data", but there is an expression represented by the "original image (or image)".

Figure 9:
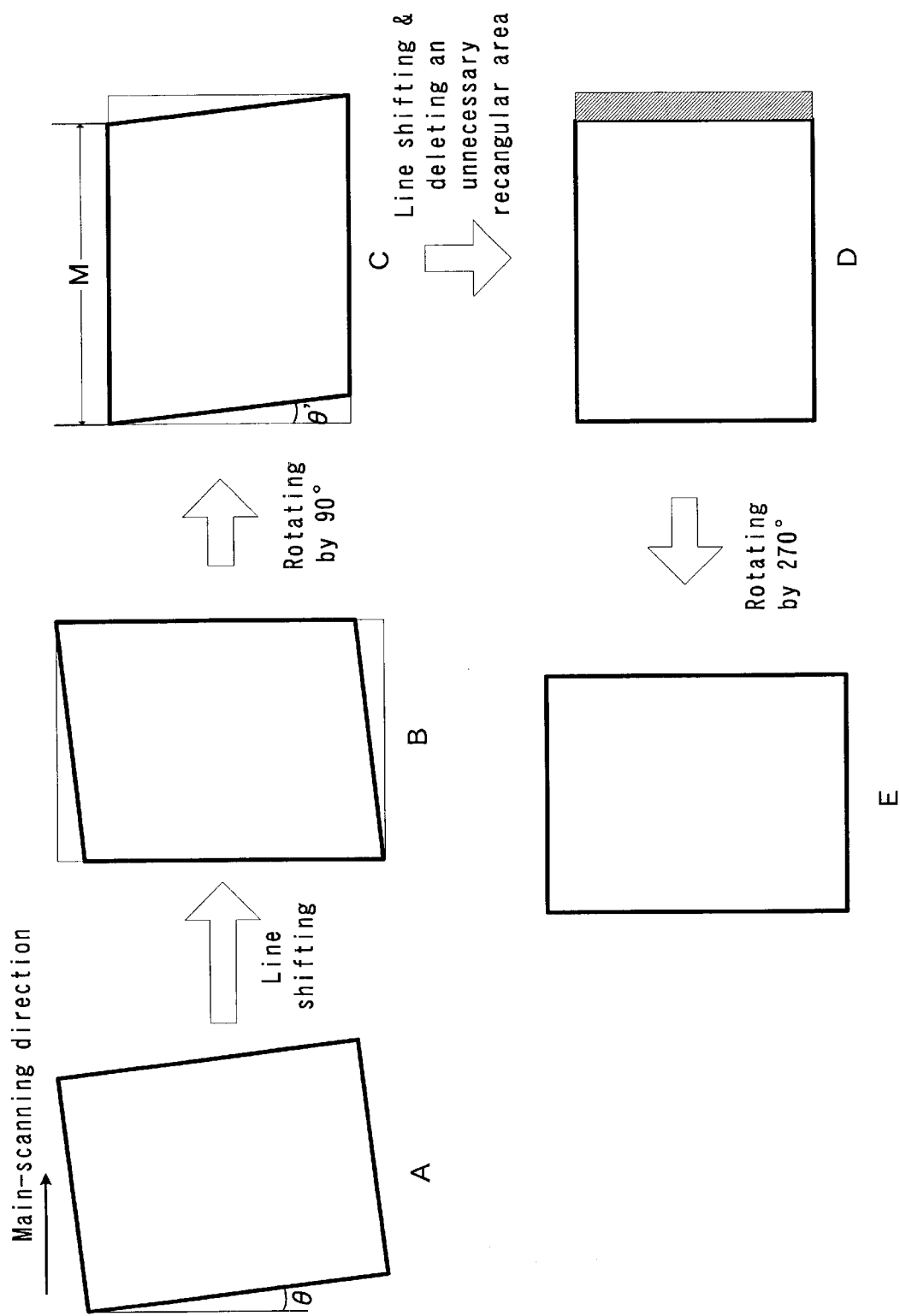
FIG. 9 is a schematic explanatory diagram of the inclination correcting in the present invention.

When the original is placed on an original setting plate being inclined by an angle θ counterclockwise, the original area of the image is transformed to a parallelogram by the line shifting in the main-scanning direction (which is called "a first line shifting" hereinafter) (FIG. 9, A→B).

Next, the image is rotated by 90 degree (FIG. 9, B→C).

Accordingly, the main-scanning direction of the image is interchanged with the sub-scanning direction.

Furthermore, while the original area of the parallelogram is transformed to a rectangular by the line shifting in the main-scanning direction, [being the sub-scanning direction at the first line shifting (which is called "a second line shifting" hereinafter)], the unnecessary rectangular area outside the original (which is represented as a hatching portion shown in FIG. 9D) is cut off (FIG. 9, C→D) as described later.

At last, the image is rotated by 270 degree (FIG. 9, D→E). Therefore, the main-scanning direction and the sub-scanning direction of the image turn back to initial directions respectively.

According to the sequence of the above processings, the inclination of the image is corrected as shown in FIG. 9E.

In the sequence of above processings, however, it occurs that there is a difference in the magnification between the image shown in FIG. 9D and that shown in FIG. 9A Namely, where the inclined angle of the image is defined as θ, the image shown in FIG. 9D is reduced cos θ times of that in FIG. 9A. Therefore, it is arranged in the invention that the magnification difference is corrected at the time of the regular scanning (described later).

The inclined angle θ of the original shown in FIG. 9A is not geometrically identical to the inclined angled θ' between the edge of the original and the horizontal line (which will be explained later).

The rotating of 270 degree shown in FIG. 9D is performed in order to turn back the direction of the original to the initial direction, therefore if not desired, the rotating may not be executed.

Furthermore, the above explanation is made according to only the case of placing the original slantingly on the original setting plate. But even if the original is placed slantingly on the original setting plate passing through ADF 50, it is needless to say that the same inclination correcting as the above can be carried out.

[The Regular Scanning for the Inclination Correcting]

Figure 7:
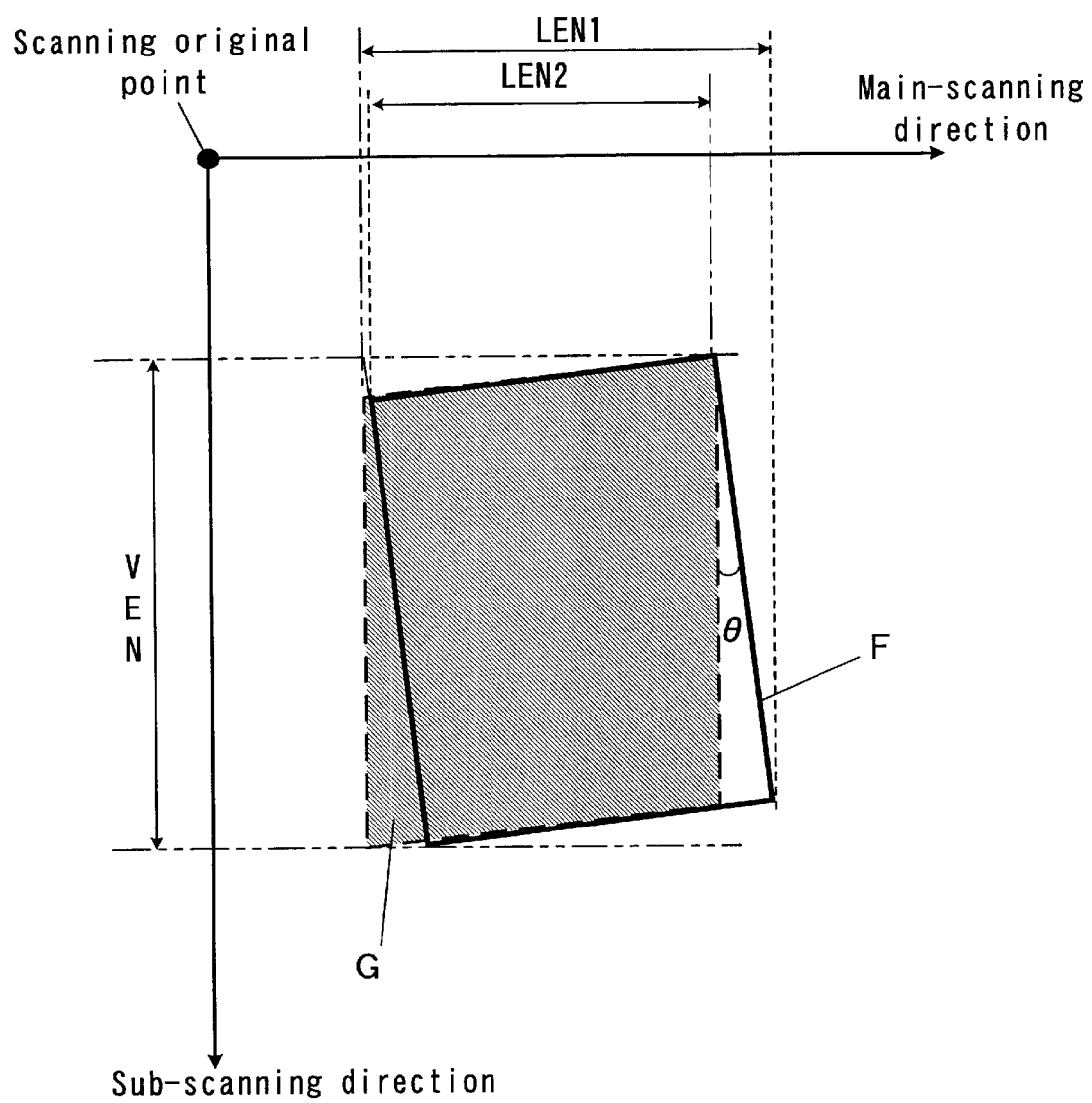
FIG. 7 is an explanatory diagram of the processing of a regular scanning.
Figure 8:
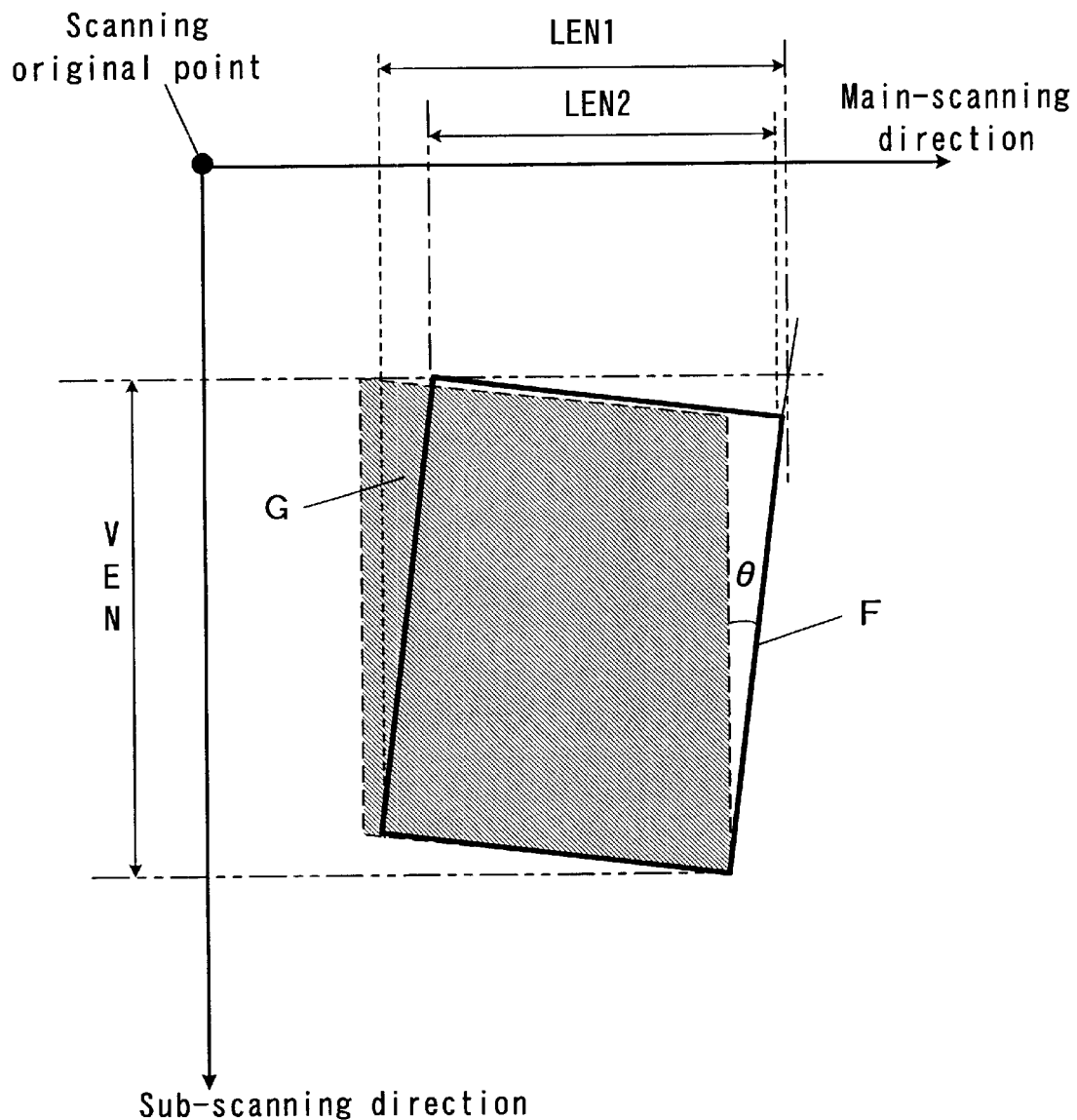
FIG. 8 is an explanatory diagram of the processing of a regular scanning.

The process at the time of the regular scanning is explained referring to FIGS. 7 and 8.

Where the original area of the read image data is defined as a rectangular F, the coordinates of four vertexes of the rectangular F can be calculated in accordance with the starting position and the terminating position And where the main-scanning effective length selected at the reading is defined as LEN1, the sub-scanning effective length is defined as VEN, and the effective width of the output LEN__ in the line shifting circuit 65 is defined as LEN2, the position and width of the main-scanning effective length LEN1, the effective width of the output LEN_LEN2, and the sub-scanning effective length VEN can be calculated in accordance with the coordinates of four vertexes thus calculated (the calculating method will be described later).

When the original is placed slantingly counterclockwise, the timing of the input and output line enable of the line shifting circuit 65 is equivalent to the timing shown in FIG. 5. Likewise, when the original placed slantingly clockwise, the timing of the input and output line enable of the line shifting circuit 65 is equivalent to the timing shown in FIG. 6. Therefore, the rectangular F changes to a parallelogram G shown in FIGS. 7 and 8 after the first line shifting.

As described above, it is possible in the invention to perform the transformation from the rectangular F to the parallelogram G only by the timing control of the line enable. Therefore, it is not necessary to calculate the memory writing address like the conventional apparatus. As a result, the circuit constitution can be simplified very much. And it is not necessary to meet the bit width for the memory per unit writing and the bit width of the image data per pixel, too.

At the time of the regular scanning the magnification difference generated by the inclination correcting is to be corrected by the magnification correcting means. Namely, the magnification in the main-scanning direction (1/cos θ) is corrected by the main-scan interpolating/thinning circuit 63, the magnification in the sub-scanning direction (1/cos θ) is corrected by changing the mechanical speed of the sub-scanning Since the magnification correcting is performed for the multi-valued data at the time of reading the original, the deterioration of the picture quality can be kept within a minimum.

Regarding the method for calculating the main-scanning effective length LEN1, the effective width of the output LEN__LEN2, and the sub-scanning effective length VEN, the explanation is made hereinafter.

Figure 12:
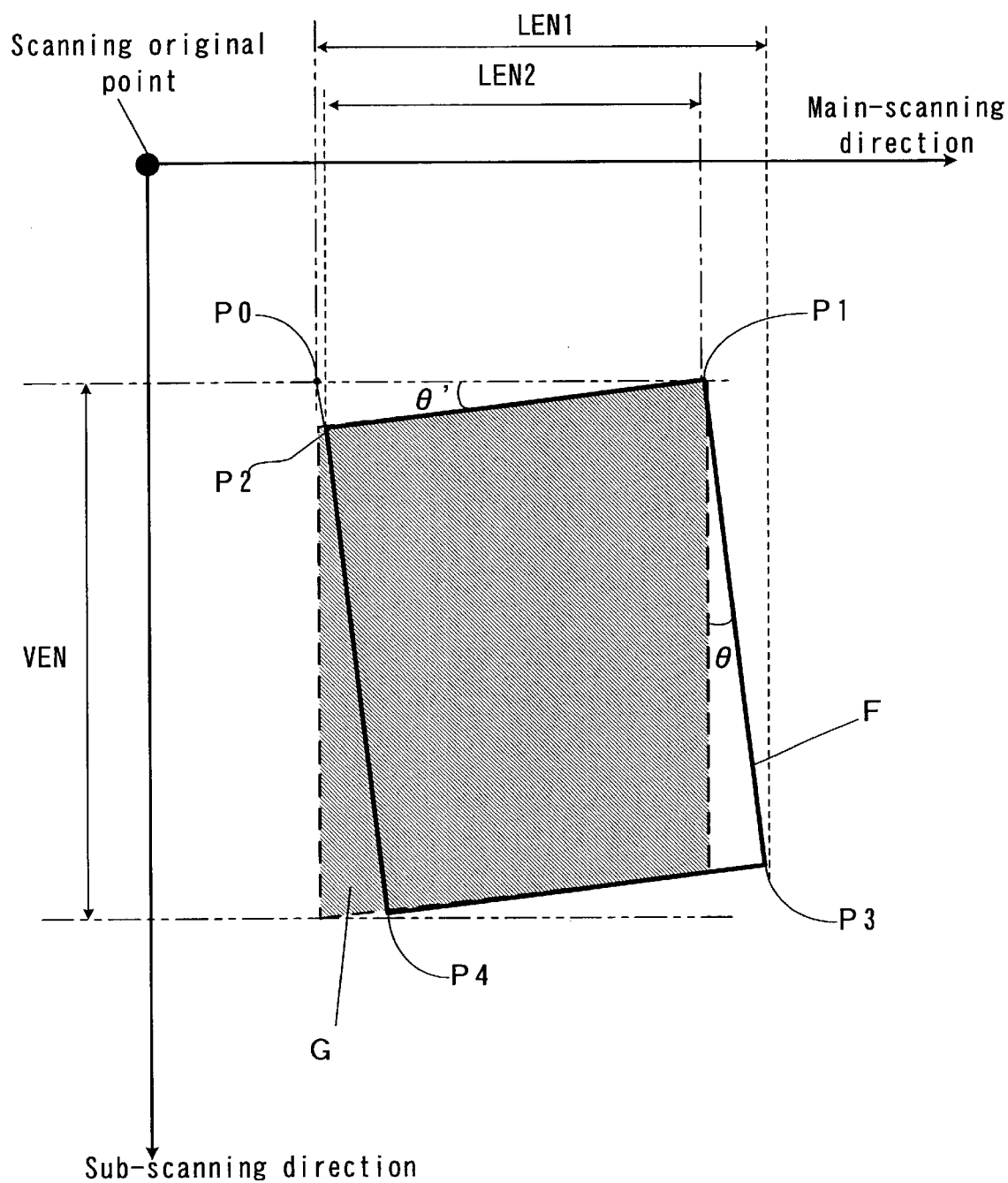
FIG. 12 is a diagram showing an calculating method of a reference point P0.

First, in accordance with the coordinates of four vertexes of the original area detected by the pre-scanning the coordinates of the reference point P0 shown in FIG. 12 is calculated. For example, where the four vertexes are defined as P1, P2, P3 and P4 respectively, the reference point P0 is existed on the line passing on P1 parallel to the main-scanning direction, and then the coordinates can be calculated according to the following expression:

$\overline{P0P1} = \overline{P1P2}/\cos θ$ [Expression 1]

After calculating the coordinates of the reference point P0, the main-scanning effective length LEN1 is calculated in accordance with the reference point P0 and the vertex P3, the effective width LEN2 of the output LEN__ is calculated in accordance with the vertexes P2 and P1, and the sub-scanning effective length VEN is calculated in accordance with the vertexes P1 and P4.

In case of selecting in advance that an original is a standard size, as the length and width of the original has been realized, the reference point P0 can be calculated according to only the vertexes P1 and P4.

Figure 13:
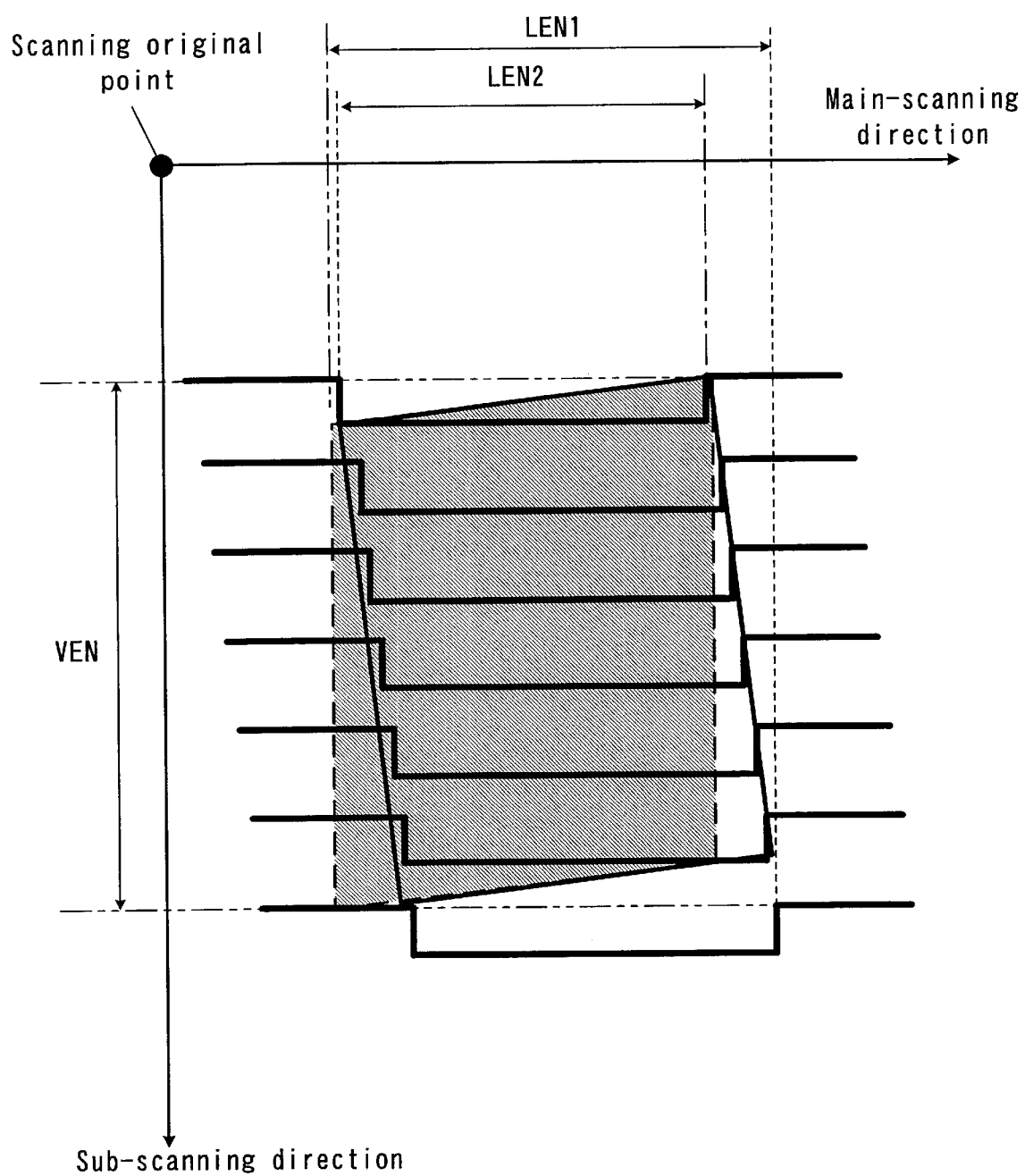
FIG. 13 is an explanatory diagram of an effective length in a main scanning direction.
Figure 14:
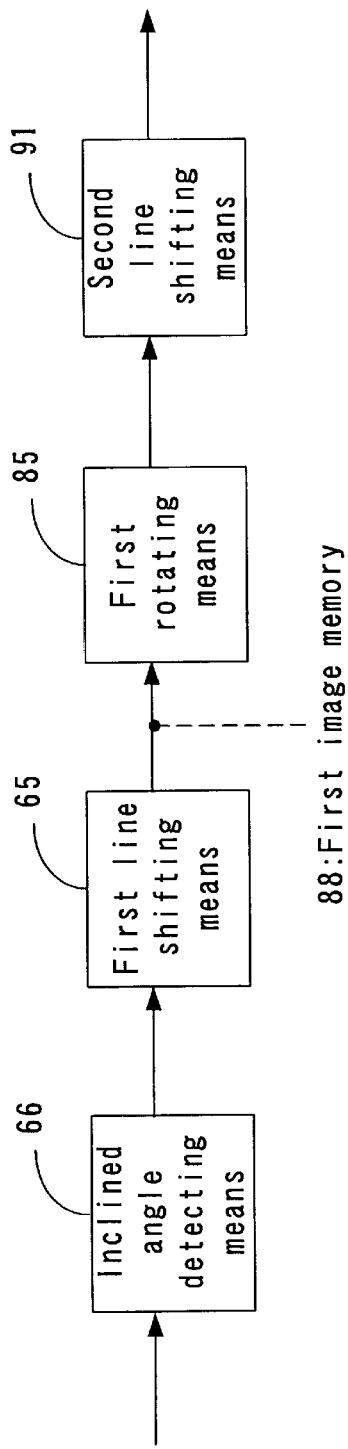
FIG. 14(a) and FIG. 14(b) are a functional block schematic diagram of the present invention.
Figure 14:
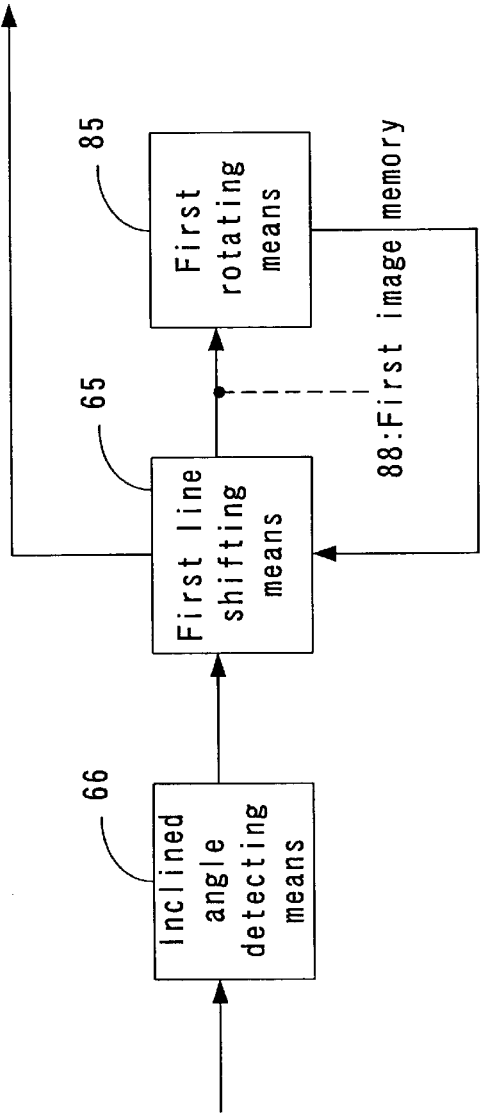

And in case the main-scanning effective length LEN1 is calculated in accordance with the vertex P2 instead of the reference point P0, a trouble occurs that the left edge of the original area F cannot be scanned, therefore the caution is required (See FIG. 13).

In the above description it is arranged that the scanning is performed only on the effective length, but the example of the scanning is not restricted to this. Namely, it may be arranged that the effective length is to be cut off from the memory after scanning on the whole length. In this case it is possible to obtain the same effect as above.

Figure 15:
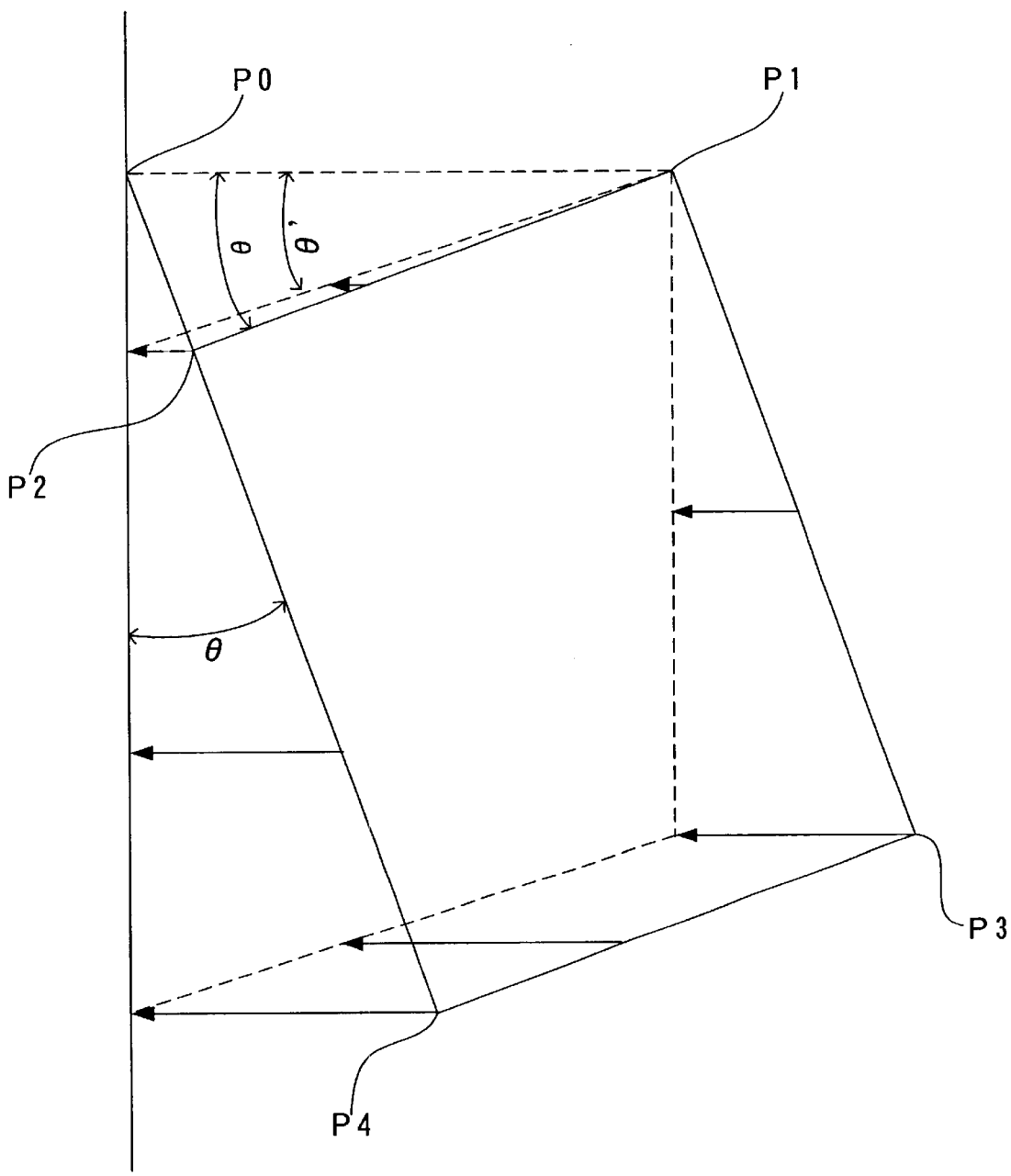
FIG. 15 is an explanatory diagram of the inclined angle after the shifting.

The shifting amount of the above shifting is shown in FIG. 15. Since the reference point for the shifting is the vertex P1, the shifting for the original area is performed for not only side edges P2P4 and P1P3 but also an upper edge P1P2 and a down edge P3P4. After the shifting the inclined angle between the edge of the original area and a horizontal line is not θ but θ'. But in case the inclined angle θ is small, even if the shifting is performed as θ=θ', the difference is small enough to be neglected. Therefore, in this embodiment the inclined angle is defined as θ=θ.

[The 90 Degree Rotating for the Inclination Correcting]

Figure 10:
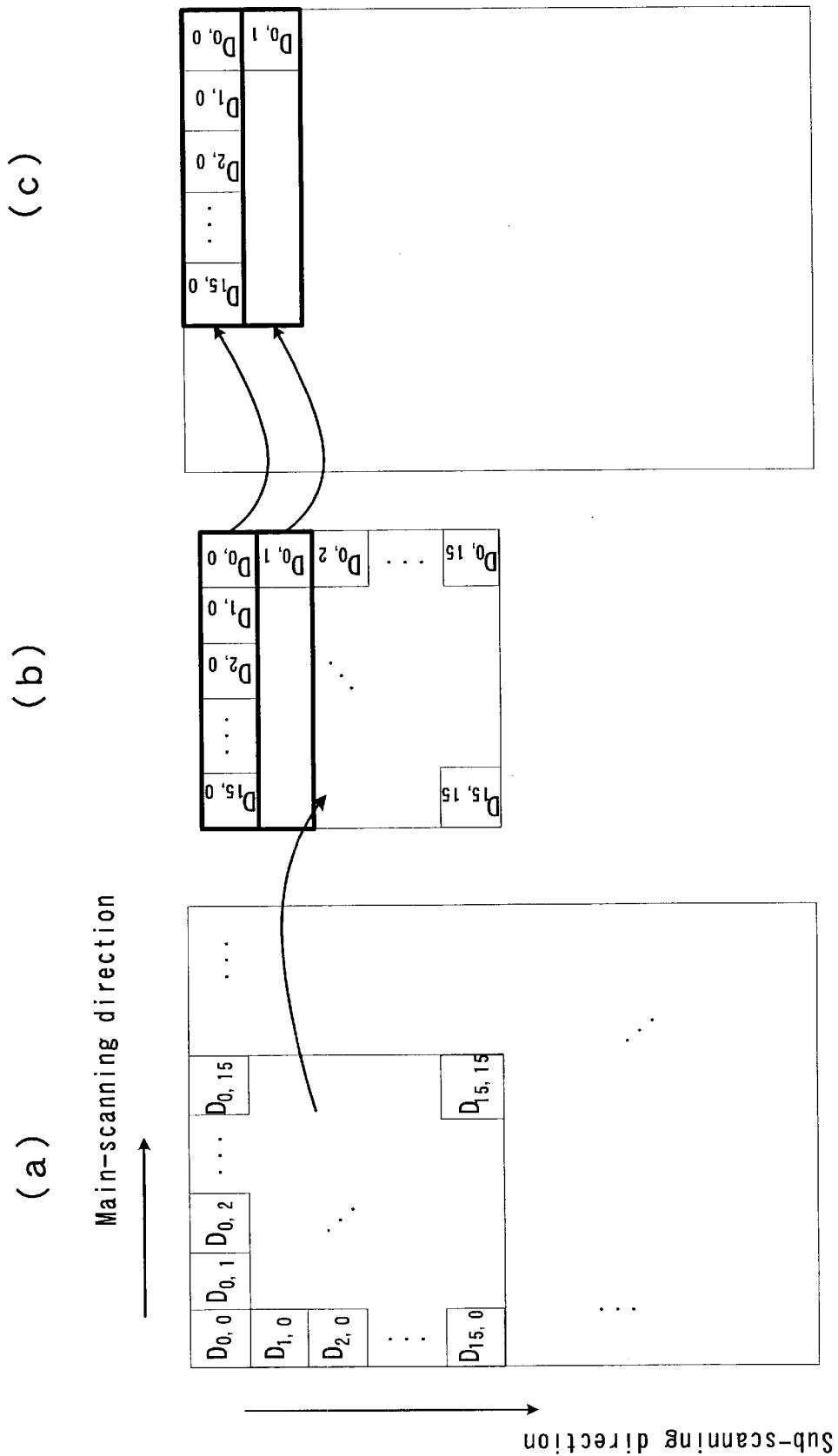
FIG. 10(a), FIG. 10(b) and FIG. 10(c) are an explanatory diagram of the rotating by 90 degree.

Referring to FIG. 10, the 90 degree rotating is described in further detail.

The image data 83 stored in the code memory 82 is decoded by the compressing/expanding circuit 93, is rotated by 90 degree by means of the rotating circuit 85 and then stored by the image memory 88.

The rotating circuit 85 rotates the image by 90 degree per pixel block of 16×16 bits (FIG. 10(a)→(b)), interchanges the main-scanning direction and the sub-scanning direction and then write it as one word per 16 bits into the image memory 88 along with performing the non-sequential address controlling FIG. 10(b)→(c)). After the image data is stored in the image memory 88 according to those steps, the image data which had been stored in the coded memory 82 must be erased.

The reason the non-sequential address controlling is required is that the writing address gets non-sequential (the word address of the second column is non-sequential to that of the first column), that is to say, the word data of the first column shown in FIG. 10(b) is written into the word address of the first column shown in FIG. 10(c) and the word data of the second column shown in FIG. 10(b) is written into the word address of the second column shown in FIG. 10(c).

[The Second Line Shifting and the Deleting of Unnecessary Areas]

The second line shifting and the deleting of the unnecessary areas described above is explained in detail.

The line shifting circuit 91 reads the image data stored by the image memory 88 and inputs it to the compressing/expanding circuit 93 performing the line shifting in the main-scanning direction. The selected operational parameters are expressed as follows by means of the inclined angle θ shown in FIG. 9.

Need or not the line shifting: Need
Direction of the line shifting: Positive direction
Initial number of pixels shifted at the line shifting: 0
Shifting amount: 1/arctan θ
Number of pixels in the main-scanning effective length: M (see FIG. 9)

The compressing/expanding circuit 93 deletes the unnecessary data of the inputted image data, that is, the rectangular area outside the original (see FIG. 9D), and encodes only the necessary rectangular area, which is stored on the code memory 82. After the image data is stored in the coded memory 82 according to those steps, the image data which has been stored in the image memory 88 must be erased.

[The 270 Degree Rotating]

The 270 degree rotating in the above description is explained in detail.

The 270 degree rotating is performed in order that the image rotated by 90 degree so as to interchange the main-scanning direction and the sub-scanning direction turns back to the initial direction. The image data 83 stored in the code memory 82 is decoded by the compressing/expanding circuit 93, is rotated by 270 degree by means of the rotating circuit 85 and then is stored in the image memory 88. The processing is the same as the 90 degree rotating and the explanation is not made here.

[The Printing Without the Zooming]

In case of printing the original image after the inclination correcting at equal magnification, the MPX 96 must be set to select the image signal 89. The image data stored by the image memory 88 after the inclination correcting is read out as the raster data of the image signal 89 synchronizing to the operation of the laser printer R and then is outputted on the recording sheet as an equal magnification image via the MPX 96, the output image processing circuit 98, the modulation circuit 100, and the laser driver 101.

[The Printing With the Zooming]

In case of printing the original image after the inclination correcting by means of the zooming (magnification and reduction), the MPX 16 must select the multi-valued image signal 99 and the MPX 96 must select the image signal 89. And at this time, the printer B must not be worked.

The image data stored by the image memory 88 after the inclination correcting is read out as the image signal 89.

After the necessary zooming is performed by the main-scan interpolating/thinning circuit 63 and the sub-scan interpolating/thinning circuit 64 included in the input image processing circuit 78, the image data is encoded by the compressing circuit 80 and then stored in the code memory 82. After the image data is stored in the code memory 82 according to those steps, the image data which has been stored in the image memory 88 must be erased. As the subsequent steps are the same as the operation in "the memory copying" described above, the explanation is not made here.

By the way, in case of performing the line shifting together with the zooming at the time of the regular scanning the difference is generated in the setting of the shifting amount. In the invention however, it is possible to carry out the printing with the zooming by performing the zooming as the post-processing.

Even though it is arranged in the invention that the storage to the image memory 88 and the code memory 88 are performed by means of the binary image, since the zooming is arranged to be performed by converting to the multi-valued image, it is possible to carry out both the reduction of the memory capacity and the zooming with high quality.

Embodiment 2

It is arranged in the first embodiment that the first line shifting is performed by the input image processing circuit 78.and the second line shifting is performed by the line shifting circuit 91, but in the second embodiment, however, it is arranged that both the first and second line shifting are performed by the input image processing circuit 78.

"The regular scanning for the inclination correcting" and "the 90 degree rotating for the inclination correcting" are the same as in the first embodiment, accordingly the explanation are not made here. The subsequent processings are explained hereinafter.

The MPX 96 is set to select the image signal 89 and the MPX 76 is to select the multi-valued image signal 99. Accordingly, the image data stored by the image memory 88 after the first line shifting the 90 degree rotating and so on is inputted into the input image processing circuit 78 via the MPX 96, the output image processing circuit 98 and MPX 76, and is processed here by the second line shifting.

After this, the image data 84 which is inputted to the rotating circuit 85 via the compressing circuit 80, the code memory 82 and the compressing/expanding circuit 93 is rotated by 270 degree by the rotating circuit 85 and then printed out. The printing operation is the same as in "the printing without the zooming" and the printing with the zooming .

As described above, it is possible to carry out both the first and the second line shifting by one means called the input image processing circuit 78, therefore the constitution of the hardware can be simplify further more.

The second embodiment has been explained taking a digital copying machine as an example, but it is needless to say that the invention can be also applied to an image reading apparatus and a facsimile apparatus.

What is claimed is:

1. An image processing apparatus for correcting the inclination of image data while reading originals as image data by electric scanning, comprising:

an inclined angle detecting means for detecting an inclined angle of an original;

a first line shifting means for shifting the image data in the main-scanning direction by a specific number of lines in a shifting amount corresponding to the inclined angle detected by the inclined angle detecting means;

a first image memory for storing the image data shifted by the first line shifting means;

a first rotating means for interchanging the main-scanning direction and the sub-scanning direction by rotating the image data stored in the first image memory by 90 degrees or 270 degrees; and, a second line shifting means for shifting the image data, rotated by the first rotating means, in the main-scanning direction by the specific number of lines in the shifting amount corresponding to the inclined angle detected by the inclined angle detecting means.

2. The image processing apparatus according to claim 1, wherein the first line shifting means and the second line shifting means are a common line shifting means.

3. The image processing apparatus according to claim 2, further comprising:

a selector for selecting one of either the image data read at the reading of the original and the image data rotated by the first rotating means, and inputting the image date into the first line shifting means.

4. The image processing apparatus according to claim 1, wherein the image data to be shifted by the first line shifting means is an image signal flowing at a fixed rate.

5. The image processing apparatus according to claim 4, wherein the first line shifting means advances or delays a timing that a signal determining the effective length of an image signal becomes enabled as sub-scanning progresses.

6. The image processing apparatus according to claim 1, wherein the first line shifting means shifts the image data so that an original area may be a parallelogram, while the second line shifting means shifts the image data so that the parallelogram may be a rectangle.

7. The image processing apparatus according to claim 1, wherein the inclined angle detecting means detects the inclined angle in accordance with the image signal at a pre-scanning for the original preceding the reading of the image data.

8. The image processing apparatus according to claim 7, wherein the inclined angle detecting means is provided with means for detecting positions of original edges in the main-scanning direction, and means for recording the detected positions of the original edges corresponding to the sub-scanning direction.

9. The image processing apparatus according to claim 1, further comprising:

a second image memory for storing the image data shifted by the second shifting means, and second rotating means for turning the image data stored in the second image memory to the initial direction by rotating by 270 degrees or 90 degrees.

10. The image processing apparatus according to claim 9, wherein the first line shifting means and the second line shifting means are a common line shifting means, the first image memory and the second image memory are a common image memory, and the first rotating means and the second rotating means are a common rotating means.

11. The image processing apparatus according to claim 1, further comprising:

magnification correcting means for correcting at the time of reading the image data a magnification difference, which is generated by the inclination correcting, based on the inclined angle detected by the inclined angle detecting means.

12. The image processing apparatus according to claim 1, further comprising:

zooming means for magnifying or reducing the image data shifted by the second line shifting means.

13. The image processing apparatus according to claim 12, further comprising:
   binarization means for binarizing the image data shifted by the first line shifting means and storing the binary image data in the first image memory, and
   multi-value converting means for converting the image data shifted by the second line shift means to multi-valued data and inputting the multi-valued data into the zooming means.

14. An inclination correcting method in an image processing apparatus for correcting the inclination of image data while reading originals as image data by electric scanning, comprising:
   an inclined angle detecting step for detecting an inclined angle of an original;
   a first line shifting step for shifting the image data in the main-scanning direction by a specific number of lines in a shifting amount corresponding to the inclined angle;
   a first rotating step for interchanging the main-scanning direction and the sub-scanning direction by rotating the shifted image data by 90 degrees or 270 degrees; and
   a second line shifting step for shifting the image data, after the rotating, in the main-scanning direction by the specific number of lines in the shifting amount corresponding to the inclined angle.

15. The inclination correcting method in an image processing apparatus according to claim 14, wherein the image data in the first line shifting step is an image signal flowing at a fixed rate.

16. The inclination correcting method in an image processing apparatus according to claim 15, wherein a timing that a signal determining the effective length of an image signal becomes enabled is delayed or advanced as sub-scanning progresses.

17. The inclination correcting method in an image processing apparatus according to claim 14, wherein the first line shifting step transforms an original area to a parallelogram, and the second line shifting step transforms the parallelogram to a rectangle.

18. The inclination correcting method in an image processing apparatus according to claim 14, wherein the image data shifted by the second line shifting step turns back to the initial direction by rotating by 270 degrees or 90 degrees.

19. The inclination correcting method in an image processing apparatus according to claim 14, wherein a magnification difference generated by the inclination correcting method is corrected at the time of reading the image data in accordance with the inclined angle detected by the inclined angle detecting step.

* * * * *